United States Patent
Lee et al.

(10) Patent No.: US 10,829,392 B2
(45) Date of Patent: Nov. 10, 2020

(54) DISSOLVED AIR FLOTATION SYSTEM

(71) Applicant: DOOSAN HEAVY INDUSTRIES & CONSTRUCTION CO., LTD., Gyeongsangnam-do (KR)

(72) Inventors: Woo Nyoung Lee, Seoul (KR); Sung Won Park, Gyeonggi-do (KR); Byungsung Park, Incheon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 733 days.

(21) Appl. No.: 15/225,574

(22) Filed: Aug. 1, 2016

(65) Prior Publication Data

US 2017/0121185 A1    May 4, 2017

(30) Foreign Application Priority Data

Oct. 29, 2015 (KR) .................. 10-2015-0150844
Jan. 12, 2016 (KR) .................. 10-2016-0003954
Jan. 13, 2016 (KR) .................. 10-2016-0004219

(51) Int. Cl.
  *C02F 1/24*    (2006.01)
  *C02F 1/52*    (2006.01)
  *B03D 1/14*    (2006.01)
  *B01F 5/06*    (2006.01)
  (Continued)

(52) U.S. Cl.
  CPC .............. *C02F 1/24* (2013.01); *C02F 1/5281* (2013.01); *B01F 3/0451* (2013.01); *B01F 5/0451* (2013.01); *B01F 5/0456* (2013.01); *B01F 5/0688* (2013.01); *B01F 5/0693* (2013.01); *B01F 5/0695* (2013.01);
  (Continued)

(58) Field of Classification Search
  CPC .... C02F 1/24; C02F 1/5281; C02F 2301/024; C02F 2303/26; B03D 1/1431; B01F 5/0451; B01F 5/0456; B01F 5/0688; B01F 5/0693; B01F 5/0695; B01F 3/0451
  USPC ...................................................... 210/221.2
  See application file for complete search history.

(56) References Cited

U.S. PATENT DOCUMENTS 2,242,139 A * 5/1941 Munroe ................ C02F 1/5281
                                                        210/705
2,765,919 A * 10/1956 Juell ..................... B03D 1/028
                                                        210/703
(Continued)

FOREIGN PATENT DOCUMENTS

EP    0 965 374 A1    12/1999
EP    2 930 150 A1    10/2015
(Continued)

OTHER PUBLICATIONS

Korean Office Action dated Jun. 1, 2017 in corresponding Korean patent application 10-2016-0003954.
(Continued)

*Primary Examiner* — Thomas M Lithgow
(74) *Attorney, Agent, or Firm* — Invenstone Patent, LLC

(57) ABSTRACT

The present disclosure relates to a dissolved air flotation system using ambient air, and more particularly, to a dissolved air flotation system that is capable of allowing ambient air to be introduced in front of a pump to generate micro air bubbles with the water discharged from the pump, so that the ambient air may be used instead of compressed air.

12 Claims, 10 Drawing Sheets

(51) Int. Cl.
*B01F 5/04* (2006.01)
*B01F 3/04* (2006.01)

(52) U.S. Cl.
CPC ...... *B03D 1/1431* (2013.01); *C02F 2301/024* (2013.01); *C02F 2303/26* (2013.01)

(56) References Cited

U.S. PATENT DOCUMENTS

| | | | | |
|---|---|---|---|---|
| 3,831,758 | A * | 8/1974 | Watson, Jr. | B03D 1/24 210/199 |
| 3,932,282 | A * | 1/1976 | Ettelt | B01D 17/0205 210/195.1 |
| 4,101,409 | A * | 7/1978 | Austin | B03D 1/1431 204/277 |
| 4,477,341 | A | 10/1984 | Schweiss et al. | |
| 6,290,842 | B1 * | 9/2001 | Miyanoshita | B01D 21/0012 210/97 |
| 8,277,652 | B2 * | 10/2012 | Urquhart | B01D 21/0012 210/221.2 |
| 2007/0114183 | A1 | 5/2007 | Lee et al. | |
| 2013/0118988 | A1 | 5/2013 | Xu et al. | |

FOREIGN PATENT DOCUMENTS

| | | | |
|---|---|---|---|
| GB | 1496191 | * | 12/1977 |
| JP | 2001-129572 A | * | 5/2001 |
| JP | 2002-066539 A | * | 3/2002 |
| JP | 4002439 B2 | | 10/2007 |
| KR | 20-0259168 B1 | | 1/2002 |
| KR | 2003962230000 Y1 | | 9/2005 |
| KR | 1020070064246 A | | 6/2007 |
| KR | 10-0978038 B1 | | 8/2010 |
| KR | 10-0988474 B1 | | 10/2010 |
| KR | 2011-0046132 A | * | 5/2011 |
| KR | 10-1250819 B1 | | 4/2013 |
| KR | 10-1491001 B1 | | 2/2015 |
| KR | 10-2015-0069782 A | | 6/2015 |
| KR | 10-2015-0116511 A | | 10/2015 |

OTHER PUBLICATIONS

Extended Search Report issued in corresponding European Application No. 16182555.9, dated Oct. 28, 2016, 9 pages.

* cited by examiner

DISSOLVED AIR FLOTATION SYSTEM

CROSS-REFERENCE TO RELATED APPLICATIONS

This application claims priority to Korean Applications No. 10-2015-0150844, filed Oct. 29, 2015, No. 10-2016-0003954, filed Jan. 12, 2016, and No. 10-2016-0004219, filed Jan. 13, 2016, the contents of each of which are incorporated herein in their entirety.

BACKGROUND

Through a water treatment process or seawater desalination process, generally, suspended solids contained in raw water should be removed to satisfy the standards of water and drinking water. So as to remove the suspended solids from the raw water, a water treatment system with a mixing basin, a coagulation basin, and a flotation basin is provided.

Through the mixing basin, medicines and raw water are mixed rapidly with each other to make fine suspended solids primarily coagulated, and then, the coagulated suspended solids are discharged to the coagulation basin. Through the coagulation basin, next, the suspended solids primarily coagulated through the mixing basin grow to the sizes separable in the floating basin and are then discharged to the floating basin behind the coagulation basin.

The conventional coagulation basin has mechanical agitators separately disposed therein to produce a flow of circulating water, thereby obtaining coagulation induction and the growth of the coagulated materials through the contacts between a coagulant or an auxiliary coagulant and the suspended solids, and so as to ensure retention time for appropriate coagulation, the coagulation basin is generally multi-staged.

On the other hand, the flotation basin serves to make the coagulated materials growing in the coagulation basin float and removed. That is, micro air bubbles are attached to suspended phase contained in a dispersion medium, and they float up to the limit surface on which the dispersion medium and air come into contact with each other, thereby inducing solid-liquid separation.

In accordance with the methods for generating the micro air bubbles, the flotation basin has different kinds of flotation methods such as dissolved air flotation DAF, dispersed air or cavitation air flotation CAF, induced air flotation IAF, vacuum flotation, electro flotation, microbiological auto flotation and the like.

Among them, the dissolved air flotation DAF is a water treatment method wherein air is sufficiently dissolved in high pressure water, and if the water with the dissolved air is introduced into the bottom of the flotation basin, the pressure of the high pressure water is dropped in the water to discharge the amount of air oversaturated as micro air bubbles, so that the discharged micro air bubbles are attached to the floc in the raw water, and the bubble-floc binding materials are reduced in specific gravity and float on the surface of water by means of a buoyant force, thereby achieving solid-liquid separation. A dissolved air flotation system is a water treatment system wherein air is dissolved in water and is attached to the floc made by reacting sludge and medicine with each other to allow the floc to float on water and to be removed and discharged by means of a skimmer.

At this time, a portion of the treated water is used as circulating water and pressurized again to form the micro air bubbles. According to a dissolved air flotation system, as shown in FIG. 1, circulating water 1 is pressurized by a recycle pump 2, and the pressurized water comes into contact with compressed air in a saturator 3 and then dissolved.

According to the dissolved air flotation system using the compressed air, however, a complicated air compressor is additionally needed to generate the compressed air therefrom, and the capacity of service air of a plant is increased, thereby raising both of capital expenditure and operating expenses.

BRIEF SUMMARY

Accordingly, the present disclosure has been made in view of the above-mentioned problems occurring in the related art, and it is an object of the present disclosure to provide a dissolved air flotation system that does not require compressed air, so that no separate air compressor or service area of the system is needed, thereby reducing capital expenditure and operating expenses.

It is another object of the present disclosure to provide a dissolved air flotation system that is capable of reducing the equipment area by 20% or more than that in the existing dissolved air flotation system, thereby giving economical advantages, reducing an energy consumption rate for coagulation, and improving the water treatment efficiency of the entire system.

To accomplish the above-mentioned objects, according to the present disclosure, there is provided a dissolved air flotation system including: a coagulation part for mixing raw water and a coagulant to each other to perform formation and growth of floc; a separation part for introducing micro air bubbles through nozzles located on the bottom thereof to allow the introduced micro air bubbles to be attached to the floc, floating the floc on the water, and removing the floating floc; and a circulating water supply line for supplying circulating water in which air is dissolved to the interior of the separation part, wherein the circulating water supply line has a pump adapted to pressurize the circulating water supplied to the separation part, and ambient air is introduced in front of the pump.

According to the present disclosure, preferably, the separation part includes a plurality of flotation basins continuously arranged serially with each other in a flowing direction of the raw water, and the plurality of flotation basins are separated from each other by partition walls, so that the raw water moves to the neighboring flotation basins along the passages formed below the partition walls. At this time, each partition wall has an adjustable weir mounted on the top end thereof so as to move floating scum to the neighboring flotation basin.

According to the present disclosure, preferably, each flotation basin has a guide wall formed on the bottom portion thereof to float the micro air bubbles upward, so that the micro air bubbles are introduced into the front and rear portions of each flotation basin partitioned by the guide wall.

According to the present disclosure, preferably, each nozzle includes: a plurality of induction pipes along which the treated water supplied from the pump flows; air pipes extended to the interiors of the induction pipes to introduce the ambient air thereinto; and baffle plates for colliding the air injected from the air pipes therewith.

According to the present disclosure, preferably, each induction pipe has a conical end portion, and otherwise, each induction pipe is conical in such a manner as to be reduced in diameter as the pipe goes from one end thereof toward the other end thereof.

According to the present disclosure, preferably, the air pipes include: a main pipe connected to the ambient air; and sub-pipes branched from the main pipe in such a manner as to be extended to the interiors of the induction pipes and protrude outward from the ends of the induction pipes, and each baffle plate has a plurality of holes penetrated therein.

According to the present disclosure, preferably, the separation part includes: a first flotation basin for at the same time coagulating and floating the floc; and a second flotation basin for secondarily floating and removing the floc contained in the treated water passing through the first flotation basin.

According to the present disclosure, preferably, the circulating water containing the raw water therein is introduced into the first flotation basin and the circulating water containing the treated water therein is introduced into the second flotation basin.

According to the present disclosure, preferably, the coagulation part includes a single coagulation basin having a turbulent flow-forming derivative packed thereinto to generate a turbulent flow therefrom with no power.

According to the present disclosure, preferably, the coagulation part includes: a first mixing and coagulation part packed with a first turbulent flow-forming derivative therein to generate a high speed turbulent flow so that the floc is primarily formed in the raw water injected thereinto; and a second mixing and coagulation part packed with a second turbulent flow-forming derivative therein to generate a lower speed turbulent flow than the high speed turbulent flow in the first mixing and coagulation part so that the floc secondarily grows in the raw water passing through the first mixing and coagulation part.

According to the present disclosure, preferably, the coagulation part further includes a porous separation member adapted to partition the first mixing and coagulation part and the second mixing and coagulation part from each other to maintain the different turbulent flow strengths between the first mixing and coagulation part and the second mixing and coagulation part, and the porous separation member is a separation membrane.

According to the present disclosure, preferably, the first mixing and coagulation part is located above the second mixing and coagulation part, so that the raw water passing through the first mixing and coagulation part is supplied to the second mixing and coagulation part by means of gravity.

According to the present disclosure, preferably, the first turbulent flow-forming derivative includes mesh type materials multi-layered onto each other or a plurality of fiber bundles binding with each other, and the second turbulent flow-forming derivative includes a plurality of pall ring type materials.

According to the present disclosure, preferably, the second mixing and coagulation part has a plurality of stages separately laminated onto each other, each stage being packed with the plurality of pall ring type materials, and the plurality of stages has a pall ring type material-packing density reduced as the stages go toward the downstream sides thereof.

BRIEF DESCRIPTION OF THE DRAWINGS

The above and/or other aspects of the disclosure will become apparent and more readily appreciated from the following description of the embodiments, taken in conjunction with the accompanying drawings of which.

DETAILED DESCRIPTION

The present disclosure relates to a dissolved air flotation system using ambient air, and more particularly, to a dissolved air flotation system that is capable of allowing ambient air instead of compressed air to be introduced in front of a pump to generate micro air bubbles with the water discharged from the pump, so that since the ambient air is used instead of the compressed air, no separate air compressor or service area of the system is needed, thereby reducing capital expenditure and operating expenses.

Further, the present disclosure relates to a dissolved air flotation system that is capable of providing a single coagulation basin and a multi-staged flotation basin, thereby having the equipment area smaller by 20% or more than that in the existing dissolved air flotation system and that is capable of providing a manual type mixing and coagulation basin, thereby minimizing an energy consumption rate.

Reference will be now made in detail to embodiments of the present disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

In the description, when it is said that one element is described as "includes" any component, one element further may include other components unless no specific description is suggested.

In the disclosure, 'raw water' means water containing foreign matters or sludge therein, and 'floc' is foreign matters coagulated to the form of a mass through injection of a specific medicine into raw water. 'Treated water' means the water purified through the removal of the foreign matters from the raw water.

In the disclosure, further, it should be understood that pipes do not simply mean pipe passages but may include pumps for producing a flow of fluid or valves for adjusting a flow rate. The components of the disclosure are connected to one another by means of the pipes, and water as a fluid flows in the pipes. Further, valves control the flow rate of the fluid or the opening and closing of the pipes. Accordingly, it will be appropriately understood even if no separate explanation on them is given. Accordingly, a detailed explanation on them will be avoided for the brevity of the description.

Figure 2:
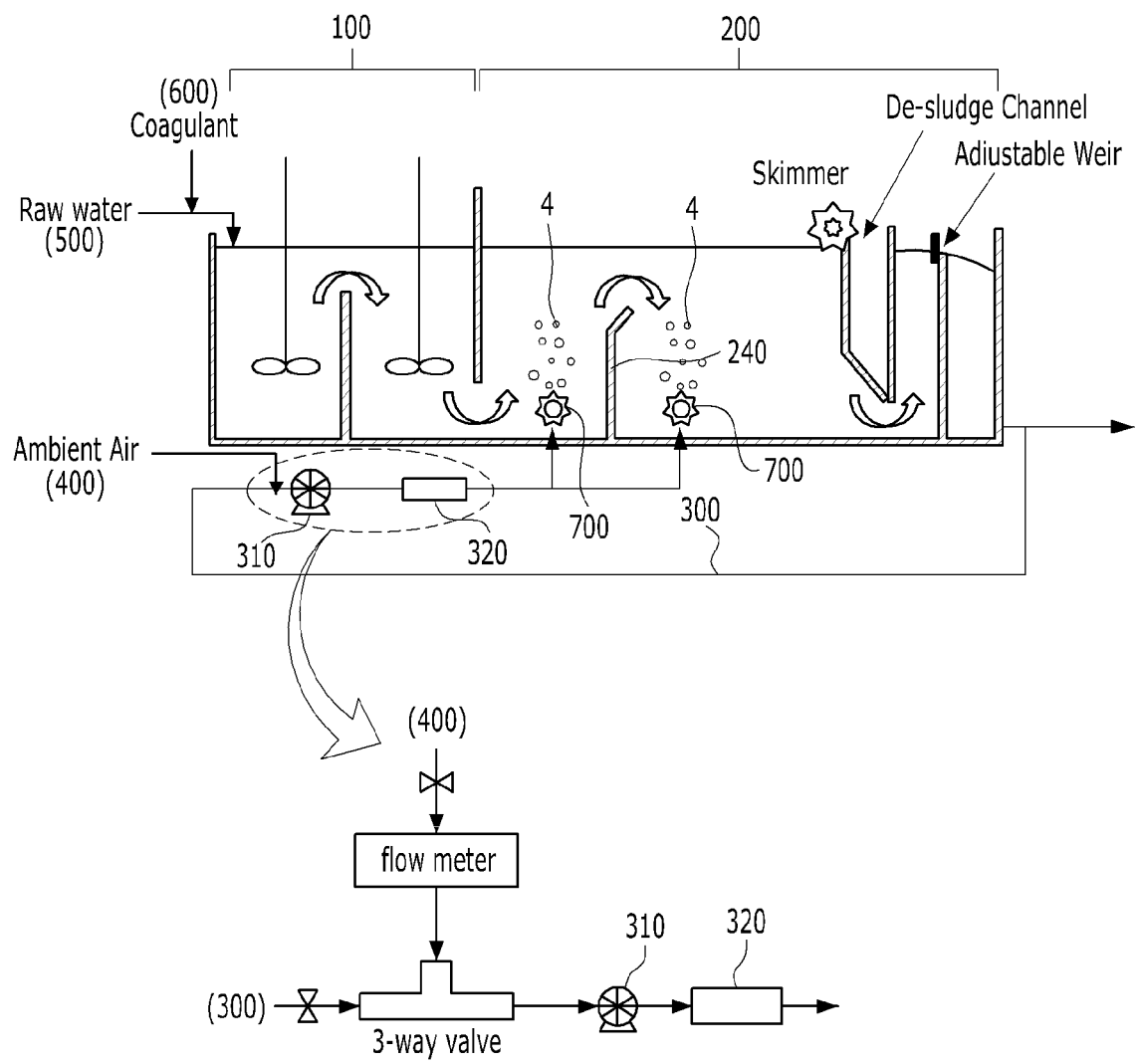
FIG. 2 is diagrams showing an operating principle of a dissolved air flotation system according to a first embodiment of the present disclosure.

According to the present disclosure, a dissolved air flotation system includes: a coagulation part 100 for mixing raw water 500 and a coagulant 600 to each other to perform formation and growth of floc; a separation part 200 for introducing micro air bubbles 4 through nozzles 700 located on the bottom thereof to allow the introduced micro air bubbles 4 to be attached to the floc, floating the floc on the water, and removing the floating floc; and a circulating water supply line 300 for supplying circulating water in which air is dissolved to the interior of the separation part 200. As shown in FIG. 2, the circulating water supply line 300 has a pump 310 adapted to pressurize the circulating water supplied to the separation part 200, and ambient air 400 is introduced in front of the pump 310.

According to the conventional dissolved air flotation system, generally, circulating water is pressurized by a pump, and the pressurized water comes into contact with compressed air in a saturator, thereby dissolving the compressed air. However, the system using the compressed air additionally needs a complicated air compressor to generate the compressed air therefrom, so that the capacity of service air of a plant should be increased, thereby undesirably raising capital expenditure and operating expenses.

So as to solve the above-mentioned problems, the dissolved air flotation system according to the present disclosure allows the ambient air to be introduced in front of the pump 310 pressurizing the circulating water, without requiring any compressed air, so that the circulating water is pressurized by the pump 310 and at the same time the air in the circulating water is dissolved within the pump 310.

Accordingly, the circulating water is pressurized by the pump 310 and at the same time the air in the circulating water is dissolved within the pump 310, thereby requiring no separate compressed air, and further, an air flow meter and a valve are additionally mounted on a pipe introducing the ambient air thereinto to control the quantity of ambient air introduced into the pipe, thereby reducing cavitation or abnormal phenomenon of the fluid occurring within the pump 310 (e.g., see the enlarged portion of FIG. 2).

According to the conventional dissolved air flotation system, on the other hand, a large capacity of saturator is used so that the compressed air is dissolved in the pressurized circulating water, and in this case, the saturator has an internal surface area enlarged by filling a packing material thereinto or by forming a structure. According to the present disclosure, however, the air may be dissolved within the pump 310, thereby not requiring a large capacity saturator.

However, since the air bubbles, which are not completely dissolved, may be formed in the circulating water due to short retention time within the pump 310 and the fluctuations in the quantity of air introduced, desirably, a stabilizer 320 may be separately mounted behind the pump 310 so as to retain the air bubbles not completely dissolved therein for a given period of time and thus to dissolve the air bubbles in the circulating water again.

The stabilizer 320 is adapted to allow the air bubbles not completely dissolved in the circulating water to be joined and separated to/from each other and completely dissolved in the pressurized circulating water, so that the stabilizer 320 has facilities and capacity substantially smaller than those of the saturator 3 used in the conventional system.

Figure 1:
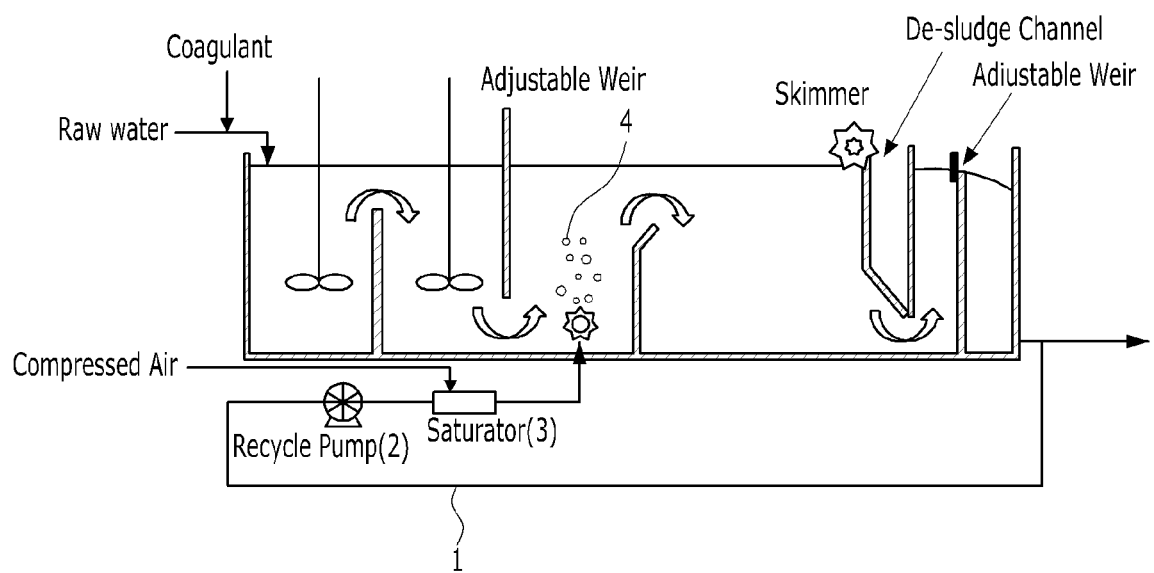
FIG. 1 is a diagram showing an operating principle of a dissolved air flotation system.

According to the conventional dissolved air flotation system, on the other hand, treated water (produced water) whose water treatment is completed is generally used as the circulating water (See FIG. 1). That is, the treated water is circulated along the flotation basins and thus continuously occupies a portion (10 to 20 vol % of the total quantity of water treated) of a quantity of water treated, thereby undesirably reducing the capacity of raw water to be treatable and decreasing a water treatment efficiency.

So as to solve the above problem, however, if raw water whose water treatment is not carried out is used as the circulating water, the raw water is passed through the saturator 3 to generate biofouling, thereby undesirably reducing a saturation efficiency and decreasing a water treatment efficiency.

If the raw water is used as the circulating water, that is, biofouling occurs due to the formation of microorganisms on the packing material in the saturator 3, which becomes more serious to the saturator having a shape of a pressure vessel with a high height and a large volume.

According to the present disclosure, as mentioned above, the dissolved air flotation system does not require a large capacity for saturator 3 and makes use of the stabilizer 320 having facilities and capacity substantially smaller than those of the saturator used in the conventional system, so that even if the raw water or the raw water mixed with the coagulant is used as the circulating water, the biofouling may be reduced.

If the raw water is used as the circulating water, on the other hand, the capacity of water treated is increased, but the raw water not passed through the coagulation part 100 is introduced just into the separation part 200, so that the formation and growth of floc within the raw water are not sufficiently achieved, thereby decreasing the water treatment efficiency.

According to the present disclosure, therefore, the separation part 200 may include a plurality of flotation basins continuously arranged serially with each other in a flowing direction of the raw water, unlike the conventional system having one flotation basin, so that the formation and growth of floc in the plurality of flotation basins are sufficiently achieved, thereby preventing the water treatment efficiency from being decreased due to the failure in the sufficient formation and growth of floc within the raw water.

Figure 3:
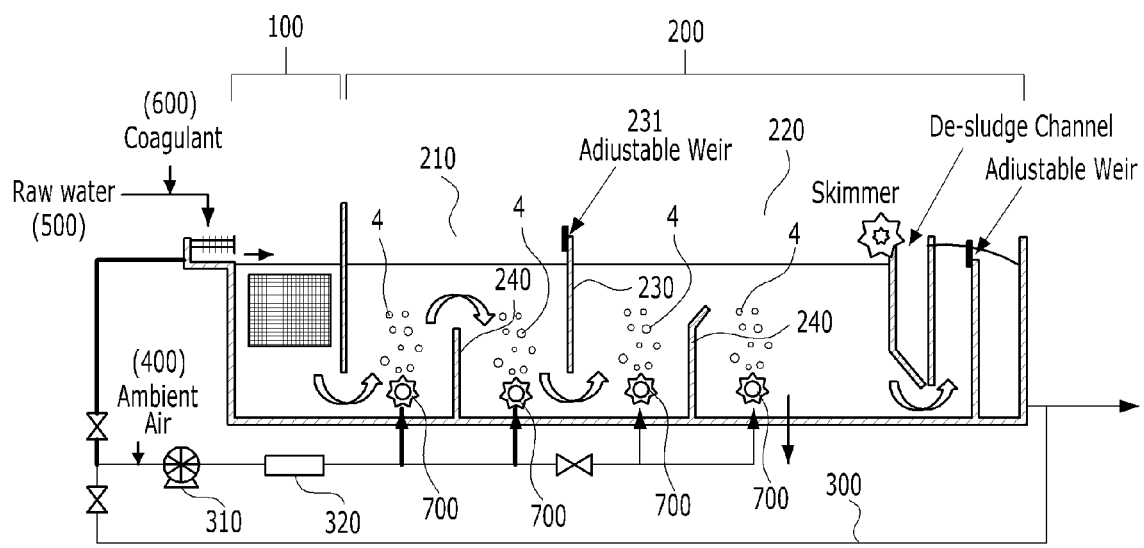
FIG. 3 is diagrams showing an operating principle of a dissolved air flotation system according to a first embodiment of the present disclosure.

In more detail, as shown in FIG. 3, the plurality of flotation basins may be separated from each other by partition walls 230, and accordingly, the raw water moves to the neighboring flotation basins along the passages formed below the partition walls 230.

At this time, scum floating from the flotation basin located on the front stage is removed by means of a skimmer mounted on the top end of each partition wall 230. Desirably, as shown in FIG. 3, an adjustable weir 231 is mounted on the top end of each partition wall 230 so as to move the floating scum to the neighboring flotation basin, without having any skimmer, and thus, the floating scum is finally separated and removed efficiently by means of the skimmer mounted on the top end of the last partition wall 230.

Further, guide walls 240 are formed on the bottoms of the respective flotation basins so as to float the micro air bubbles upward, and according to the conventional system, as shown in FIG. 1, the micro air bubbles are generally introduced only into the front surfaces of the guide walls. That is, the micro air bubbles injected from the bottoms of the front surfaces of the guide walls 240 float upward along the guide walls 240 to cause the floc within the raw water to float on the surface of water. At this time, the raw water existing the bottoms of the rear surfaces of the guide walls 240 does not have any contact with the micro air bubbles, thereby undesirably decreasing the separation and removal efficiencies of the floc not contacted with the micro air bubbles on the front surfaces of the guide walls.

According to the present disclosure, as shown in FIGS. 2 and 3, the micro air bubbles are introduced into the front and rear surfaces of the flotation basins separated by the guide walls 240, respectively, so that even the floc not contacted with the micro air bubbles on the front surfaces of the guide walls 240 is sufficiently contacted again with the micro air bubbles on the rear surfaces of the guide walls 240, thereby improving the separation and removal efficiencies of the floc.

The number of flotation basins constituting the separation part 200 is freely changed in accordance with their applicable situations, and for example, the separation part 200 includes a first flotation basin 210 for coagulating and floating the floc at the same time and a second flotation basin 220 for secondarily floating and removing the floc contained in the treated water passing through the first flotation basin 210.

At this time, the circulating water introduced into the first flotation basin 210 and the second flotation basin 220 is used freely with the treated water, the raw water 500, or the raw water 500 mixed with the coagulant 600. So as to enhance the treatment efficiency of the raw water used as the circulating water, for example, the raw water 500 or the raw water mixed with the coagulant 600 is introduced into the first flotation basin 210 for at the same time coagulating and floating the floc, and the circulating water containing the treated water therein is introduced into the second flotation basin 220 for secondarily floating and removing the floc contained in the treated water passing through the first flotation basin 210.

That is, as shown in FIG. 3, the circulating water supplied to the lower portion of the separation part 200 is supplied as the raw water 500 or the raw water mixed with the coagulant 600 through appropriate valve manipulations if necessary, and otherwise, the treated water obtained through the dissolved air flotation system according to the present disclosure is circulated and supplied to the separation part 200.

If necessary, further, a plurality of pumps 310 and stabilizers 320 are additionally provided, so that the raw water 500 or the raw water mixed with the coagulant 600 can be used as the circulating water supplied to the lower portion of the first flotation basin 210 and the treated water obtained through the dissolved air flotation system according to the present disclosure can be circulated and supplied to the lower portion of the second flotation basin 220.

As mentioned above, on the other hand, if the separation part 200 has the plurality of flotation basins, the coagulation and growth of the floc are achieved even in the flotation basins, thereby simplifying the conventional configuration of the coagulation part 100 having the multi-stages and the separate agitators.

According to the present disclosure, the coagulation part 100 is formed of a single coagulation basin, and desirably, the coagulation part 100 is formed of a non-power coagulation basin packed with a turbulent flow-forming derivative 111 therein to generate a turbulent flow, thereby replacing the functions of the conventional mechanical mixing and coagulation basins.

Figure 4:
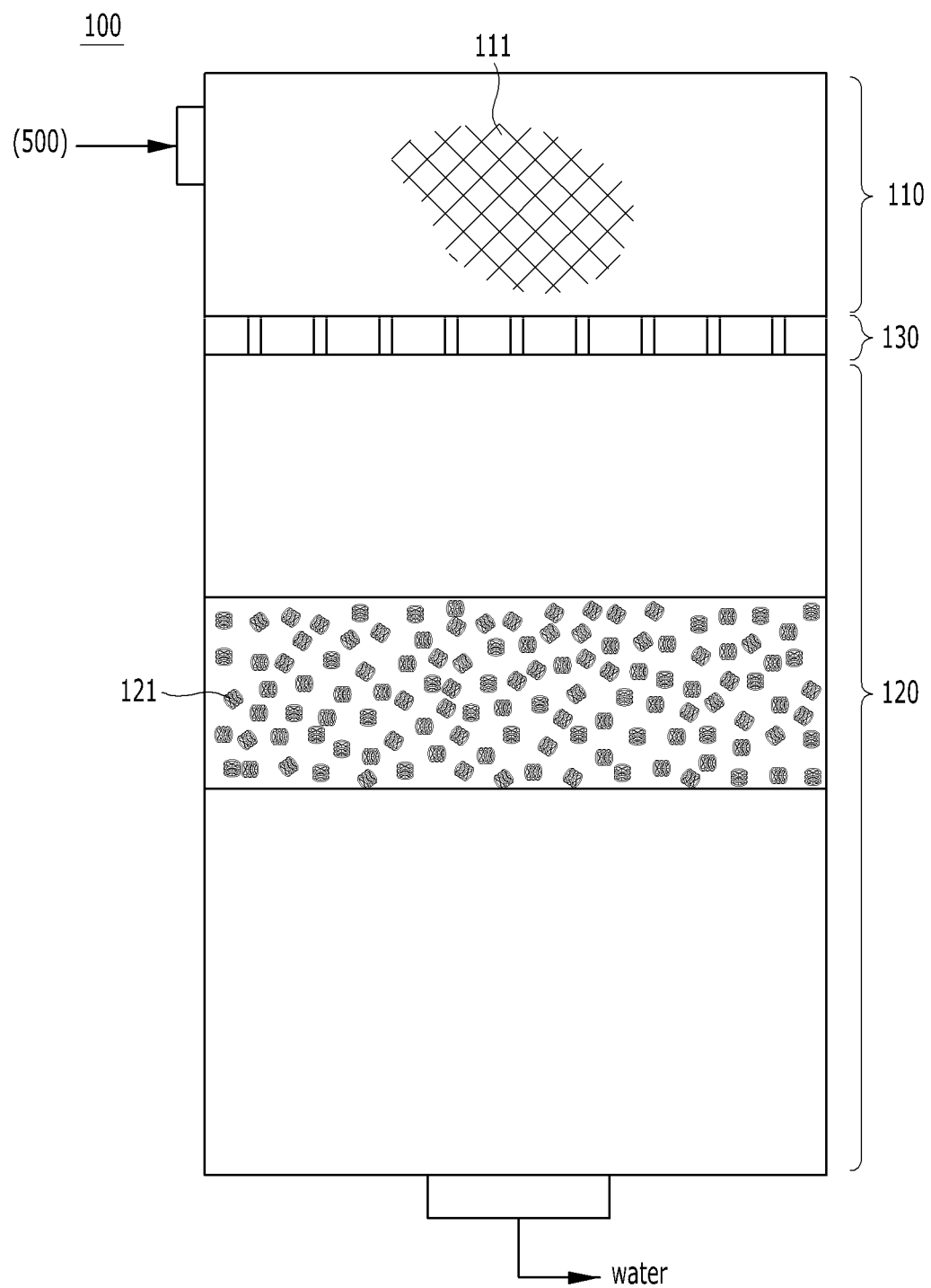
FIG. 4 is a diagram showing a non-power mixing and coagulation basin of the dissolved air flotation system according to the first embodiment of the present disclosure.

More desirably, as shown in FIG. 4, the coagulation part 100 includes: a first mixing and coagulation part 110 packed with a first turbulent flow-forming derivative 111 therein to generate a high speed turbulent flow so that floc is primarily formed in the raw water injected thereinto; and a second mixing and coagulation part 120 packed with a second turbulent flow-forming derivative 121 therein to generate a lower speed turbulent flow than the high speed turbulent flow in the first mixing and coagulation part 110 so that the floc secondarily grows in the raw water passing through the first mixing and coagulation part 110.

Under the above-mentioned configuration, while the fine particles contained in the raw water are being circulated in the coagulation part 100 through the turbulent flows, without having any agitating power, they come into contact with the coagulant and are thus coagulated to given sizes.

Further, the coagulation part 100 includes a porous separation member 130 adapted to partition the first mixing and coagulation part 110 and the second mixing and coagulation part 120 from each other to maintain the different turbulent flow strengths between the first mixing and coagulation part 110 and the second mixing and coagulation part 120, and the porous separation member 130 is used with a porous membrane.

At this time, desirably, the first mixing and coagulation part 110 is located above the second mixing and coagulation part 120, so that the raw water passing through the first mixing and coagulation part 110 is supplied to the second mixing and coagulation part 120 by gravity.

Referring in detail to the operating process of the non-power coagulation part 100, the raw water introduced from an inlet pipe to the form of a linear flow of water is passed through the first turbulent flow-forming derivative 111 packed in the first mixing and coagulation part 110 to generate the high speed turbulent flow therefrom, and next, the fine particles contained in the raw water come into contact with the coagulant by the generation of the turbulent flow to form the floc in the raw water. The first turbulent flow-forming derivative 111 includes mesh type materials multi-layered onto each other or a plurality of fiber bundles binding with each other, and desirably, the holes between the neighboring mesh type materials are laminated asymmetrically onto each other in a vertical direction.

Since the holes between the neighboring mesh type materials are laminated asymmetrically on each other in a vertical direction, the raw water is passed through the mesh type materials by gravity to generate the turbulent flow therefrom, and the speed of the turbulent flow generated is controllable in accordance with the sizes of the holes.

The second mixing and coagulation part 120 is a space in which the floc contained in the raw water can grow through the low speed turbulent flow generated while the treated water is passing through the first mixing and coagulation part 110.

The second turbulent flow-forming derivative 121 includes a plurality of pall ring type materials packed in the second mixing and coagulation part 120, desirably, a plurality of pall ring type material stages separately laminated onto each other, each stage being packed with the plurality of pall ring type materials.

Figure 5:
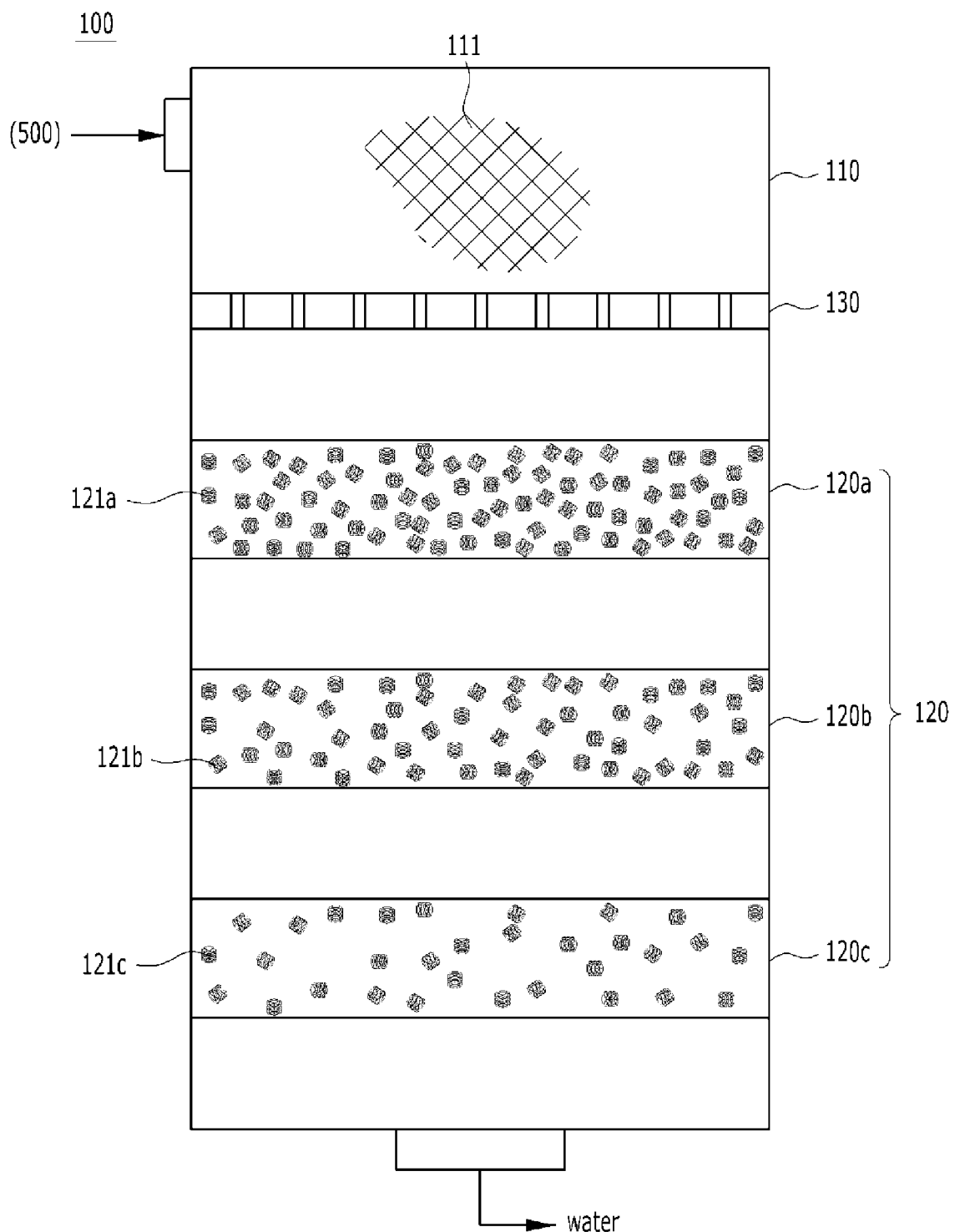
FIG. 5 is a diagram showing a non-power mixing and coagulation basin of the dissolved air flotation system according to the first embodiment of the present disclosure.

FIG. 5 is a schematic view showing the plurality of pall ring type material stages laminated onto each other, wherein each stage is packed with the plurality of pall ring type materials. The number of stages in which pall ring type materials 121a, 121b and 121c are packed is controllable in accordance with the states of the raw water in the second mixing and coagulation part 120. In this case, desirably, the plurality of stages 120a, 120b and 120c are separable from each other in such a manner as to have a packing density reduced as it goes toward the downstream side area. That is, the lower the packing density is, the lower the speed of the turbulent flow is, so that the floc can grow to relatively larger sizes.

On the other hand, the separation member 130 is adapted to partition the first mixing and coagulation part 110 and the second mixing and coagulation part 120 from each other to maintain the different turbulent flow strengths between the first mixing and coagulation part 110 and the second mixing and coagulation part 120. The first mixing and coagulation part 110 generates the high speed turbulent flow and the second mixing and coagulation part 120 generates the low speed turbulent flow, so that the fine particles contained in the raw water are coagulated to allow the floc to be formed and grow, and the speeds of the high speed turbulent flow and the low speed turbulent flow are not specifically limited therein, which are defined as a relative difference between the turbulent flow strengths in the mixing and coagulation basins.

In case of the nozzles 700 mounted on the bottom surface of the separation part 200 of the dissolved air flotation system according to the present disclosure, unlike those in the enlarged portion of FIG. 2, the ambient air is mixed with the pressurized circulating water in the nozzles 700 and then discharged from the nozzles 700, thereby producing the micro air bubbles 4.

Figure 6:
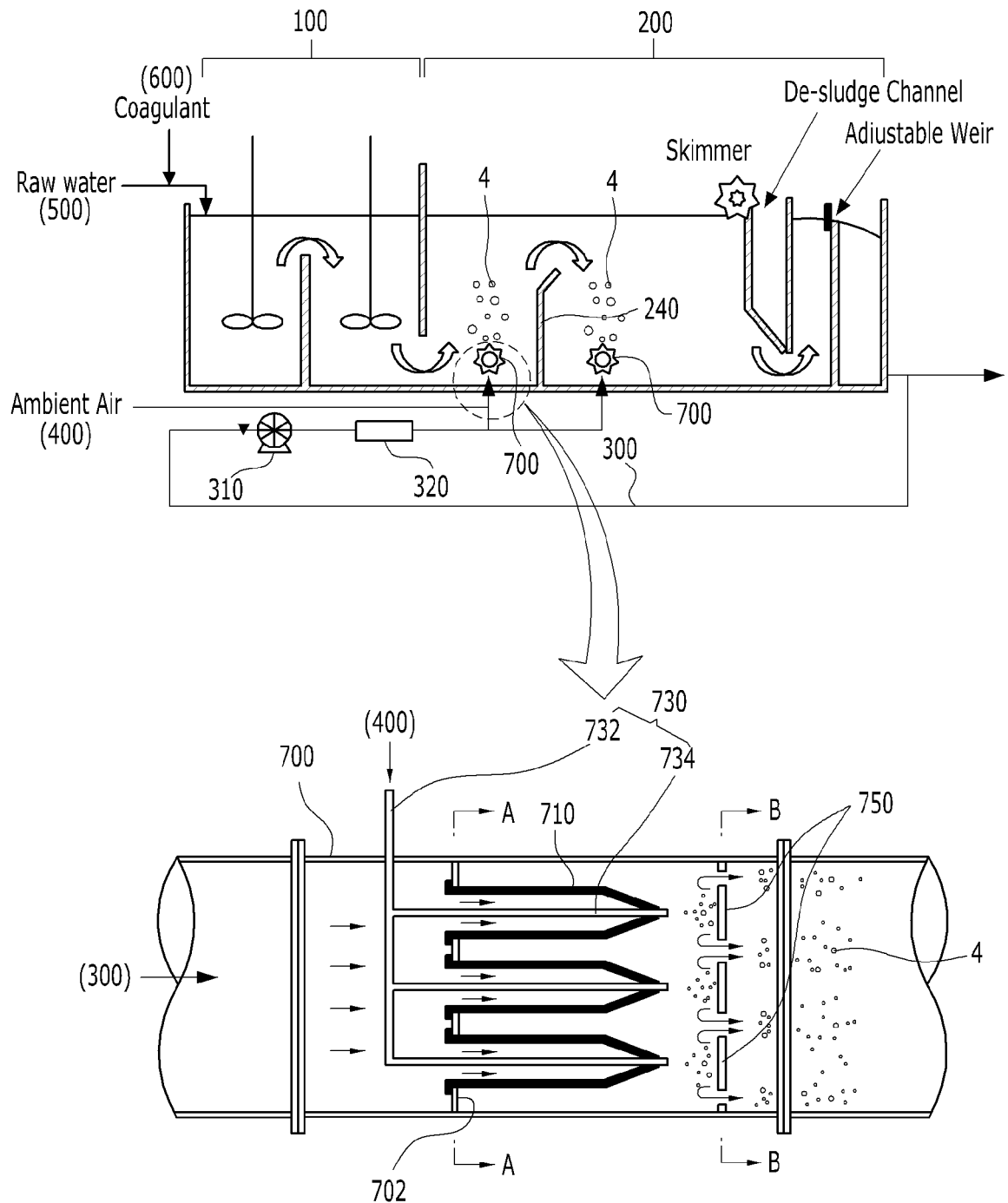
FIG. 6 is a diagram showing an operating principle of a dissolved air flotation system according to a second embodiment of the present disclosure.
Figure 7:
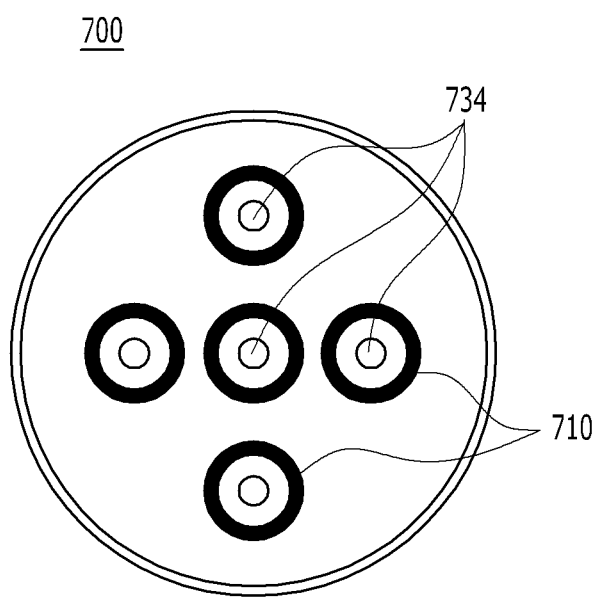
FIG. 7 is a sectional views taken along the line A-A of the enlarged portion of FIG. 6.

As shown in FIG. 6, each nozzle 700 in the dissolved air flotation system according to the second embodiment of the present disclosure has an outer shape of a cylinder and includes a plurality of induction pipes 710 along which the treated water flows, air pipes 730 into which external air is introduced, and baffle plates 750 with which the air passing through the induction pipes 710 collides.

Each induction pipe 710 is cylindrical and open on both ends thereof, and desirably, it is conical in such a manner as to be reduced in diameter as it goes toward one end thereof. The air pipe 730 is disposed in such a manner as to be passed through the center of each induction pipe 710.

Further, each air pipe 730 protrudes outwardly from the end portion of each induction pipe 710, and one end of each induction pipe 710 is supportedly coupled to each of support frames 702 separately disposed inside each nozzle 700.

At this time, desirably, the support frames 702 are disposed in the vertical direction to the direction of the flow of water, and the induction pipes 710 are disposed in the same direction as the direction of the flow of the treated water.

The treated water supplied from the pump 310 flows in the interiors of the induction pipes 710, and as each induction pipe 710 becomes reduced in diameter as it goes toward one end thereof, the sectional area of each induction pipe 710 becomes decreased. Accordingly, the flow rate of the treated water becomes increased as it reaches one end of each induction pipe 710, and thus, the pressure of the flow of the treated water becomes dropped.

If the pressure drop is generated in the end of each induction pipe 710, the pressure at the side into which the ambient air 400 is introduced becomes relatively high, so that the external air is introduced into each nozzle 700. The introduced air is supplied to the air pipes 730.

The air pipes 730 are pipes along which the ambient air flows, and the air pipes 730 include a main pipe 732 connected to the ambient air 400 and a plurality of sub-pipes 734 branched from the main pipe 732 in such a manner as to be inserted into the induction pipes 710. The air pipes 730 are disposed in the same direction as the direction of the flow of the treated water, that is, in the longitudinal direction thereof.

The air supplied to the air pipes 730 is discharged to the ends of the induction pipes 710 together with the water flowing in the induction pipes 710 and thus collides with the baffle plates 750 spaced apart by a given distance from the ends of the induction pipes 710 and the ends of the air pipes 730.

Figure 8:
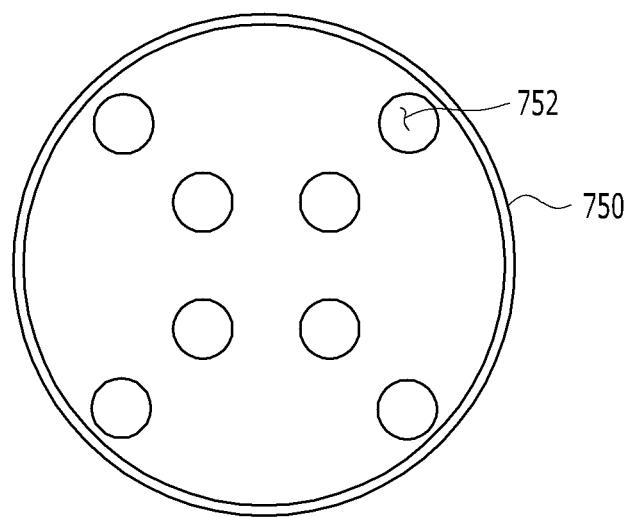
FIG. 8 is a sectional views taken along the line B-B of the enlarged portion of FIG. 6.

As shown in FIG. 8, the baffle plates 750 are adapted to allow the air and water discharged from the ends of the air pipes 730 after passing through the induction pipes 710 to collide with each other to produce the micro air bubbles 4. Each baffle plate 750 has a plurality of holes 752 penetrated in the surface thereof, and the holes 752 have sizes and arrangements capable of generating shear stress therefrom. If the sizes of the holes 752 are too small, a differential pressure is increased, and accordingly, the holes 752 desirably have appropriate sizes. Further, the number of baffle plates 750, the sizes of baffle plates 750 or the diameters of air pipes 730 are appropriately determined so as to produce the micro air bubbles 4 having uniform sizes, which can be of course freely changed in accordance with the designs of the system.

According to the conventional system, as mentioned above, the air compressor and the air saturator are provided to allow the floc to float by means of the compressed air generated therefrom. However, disadvantageously, the separate cost for the air compressor and the air saturator is needed and a large area for installing them is also required.

According to the present disclosure, however, the ambient air is used instead of the compressed air, and accordingly, advantageously, the problems occurring in the conventional system have been solved.

On the other hand, the nozzles 700 according to the present disclosure may have another configuration, and hereinafter, an explanation on another nozzle configuration will be given (wherein the same parts as the above-mentioned nozzle configuration are denoted by different reference numerals from each other, but their detailed description will be avoided).

Figure 9:
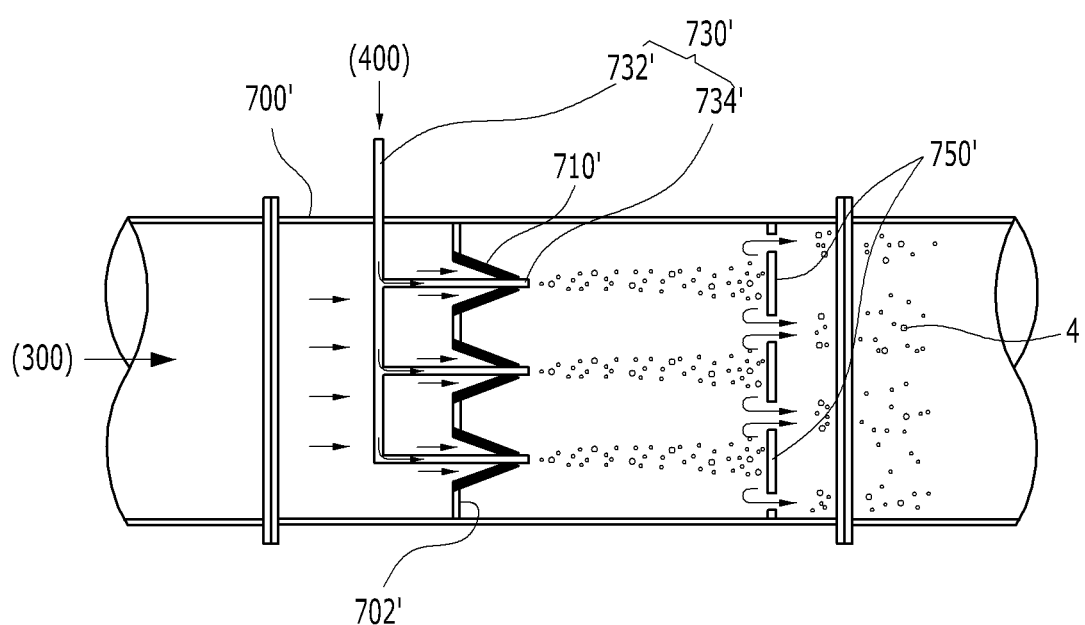
FIG. 9 is a diagram showing another example of the air injection nozzle of FIG. 6.

FIG. 9 is a diagram showing another example of the air injection nozzle of FIG. 6.

As shown in FIG. 9, an air injection nozzle 700' is configured wherein one end of each of induction pipes 710' is coupled to each of support frames 702' and the other end thereof is extended in a direction of flow of water. Each induction pipe 710' is conical in such a manner as to be reduced in diameter as it goes toward the extended other end thereof from one end coupled to each support frame 702'.

Sub-pipes 734' branched from a main pipe 732' of air pipes 730' are disposed along the centers of the interiors of the induction pipes 710', and the air pipes 730' protrude outwardly from the ends of the induction pipes 710'. Further, baffle plates 750' are spaced apart by a given distance from the induction pipes 710'.

The air discharged through the air pipes 730' is mixed with water passing through the induction pipes 710' and injected into the baffle plates 750'. Next, the air colliding with the baffle plates 750' is broken to the form of micro air bubbles 4.

Figure 10:
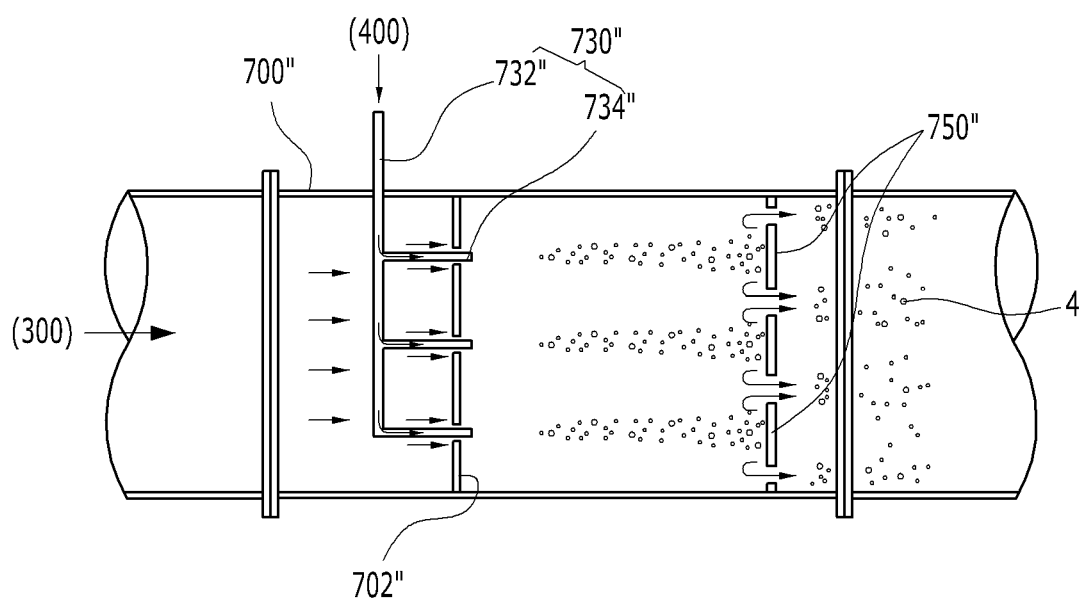
FIG. 10 is a diagram showing yet another example of the air injection nozzle of FIG. 6.

FIG. 10 is a diagram showing yet another example of the air injection nozzle of FIG. 6.

As shown in FIG. 10, an air injection nozzle 700" is configured only to have air pipes 730", without having any induction pipes. The air pipes 730" include a main pipe 732" and a plurality of sub-pipes 734" branched from the main pipe 732", and the ends of the sub-pipes 734" are passed through support frames 702" in such a manner as to protrude outwardly from the support frames 702". At this time, each sub-pipe 734" is spaced apart by a given distance from the support frames 702" to allow water to flow to the space between the outer periphery of each sub-pipe 734" and the support frames 702". As the water flows to the space between the outer periphery of each sub-pipe 734" and the support frames 702", pressure drop occurs, so that the ambient air 400 is introduced from the external air. The introduced air is injected into baffle plates 750" and is produced as micro air bubbles 4.

Like this, the micro air bubbles 4 formed through the different kinds of nozzles 700, 700' and 700" are coupled to the floc within the first flotation basin 210 or the second flotation basin 220 of the separation part 200, thereby allowing the floc to float.

As described above, the dissolved air flotation system according to the present disclosure is configured wherein the area occupied by the air injection system supplying the micro air bubbles is small and no separate air compressor is needed, thereby reducing the equipment investment cost, and further, wherein the air injection is performed behind the recycling pump, thereby removing the reduction of the life span of the recycling pump caused by cavitation.

Further, the embodiments discussed have been presented by way of example only and not limitation. Thus, the breadth and scope of the disclosure(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the disclosure(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any disclosure(s) in this disclosure. Neither is the "Brief Summary" to be considered as a characterization of the disclosure(s) set forth in the claims found herein. Furthermore, any reference in this disclosure to "disclosure" in the singular should not be used to argue that there is only a single point of novelty claimed in this disclosure. Multiple disclosures may be set forth according to the limitations of the multiple claims associated with this disclosure, and the claims accordingly define the disclosure(s), and their equivalents, that are protected thereby. In all instances, the scope of the claims shall be considered on their own merits in light of the specification, but should not be constrained by the headings set forth herein.

What is claimed is:

1. A dissolved air flotation system, comprising:
   a coagulator operable to mix raw water and a coagulant to form and grow floc;
   a separator operable to introduce micro air bubbles through nozzles to be attach to the floc, to float the floc on water, and to remove floating floc; and
   a circulating water supply line operable to supply circulating water in which air is dissolved to an interior of the separator,
   wherein the circulating water supply line includes a pump operable to pressurize the circulating water supplied to the separator and ambient air introduced in front of the pump, and
   wherein the circulating water supply line further includes a stabilizer mounted behind the pump to retain air bubbles for a predetermined period of time and to dissolve completely the air bubbles in the circulating water,
   wherein the separator includes a plurality of flotation basins arranged sequentially in a flowing direction of the raw water,
   wherein the plurality of flotation basins are separated from each other by partition walls so that the raw water moves to a neighboring flotation basin along passages formed below the partition walls,
   wherein the coagulator includes a single coagulation basin that includes a turbulent flow-forming derivative operable to generate a turbulent flow without requiring power,
   wherein the coagulator further includes: a first mixing and coagulation part that includes a first turbulent flow-forming derivative therein operable to generate a high speed turbulent flow so that the floc is formed in the raw water injected thereinto, and a second mixing and coagulation part that includes a second turbulent flow-forming derivative therein operable to generate a lower speed turbulent flow than the high speed turbulent flow in the first mixing and coagulation part so that the floc grows in the raw water passing through the first mixing and coagulation part,
   wherein the second turbulent flow-forming derivative includes a plurality of pall ring type materials,
   wherein the second mixing and coagulation part includes a plurality of stages laminated onto each other, each stage being packed with a plurality of the pall ring type materials, and
   wherein a density of the pall ring type material is reduced as the plurality of stages go toward downstream sides thereof.

2. The dissolved air flotation system according to claim 1, wherein each partition wall includes an adjustable weir disposed on a top end thereof so as to move floating scum to a neighboring flotation basin.

3. The dissolved air flotation system according to claim 2, wherein the floating scum is finally separated and removed by a skimmer mounted on the top end of a last partition wall disposed in a last flotation basin.

4. The dissolved air flotation system according to claim 1, wherein each flotation basin includes a guide wall formed on the bottom portion thereof to float micro air bubbles upward so that the micro air bubbles are introduced into front and rear portions of each flotation basin partitioned by the guide wall.

5. The dissolved air flotation system according to claim 1, wherein the separator includes:
   a first flotation basin operable to coagulate and float the floc; and
   a second flotation basin operable to secondarily float and remove the floc contained in treated water passing through the first flotation basin.

6. The dissolved air flotation system according to claim 5, wherein
   the circulating water containing the raw water therein is introduced into the first flotation basin, and
   the circulating water containing the treated water therein is introduced into the second flotation basin.

7. The dissolved air flotation system according to claim 1, wherein the coagulator further includes a porous separation member that partitions the first mixing and coagulation part and the second mixing and coagulation part from each other to maintain the different turbulent flow strengths between the first mixing and coagulation part and the second mixing and coagulation part.

8. The dissolved air flotation system according to claim 1, wherein the first mixing and coagulation part is disposed above the second mixing and coagulation part so that the raw water passing through the first mixing and coagulation part is supplied to the second mixing and coagulation part by gravity.

9. The dissolved air flotation system according to claim 1, wherein the first turbulent flow-forming derivative includes multi-layered mesh type materials.

10. The dissolved air flotation system according to claim 1, wherein the first turbulent flow-forming derivative includes a plurality of fiber bundles.

11. The dissolved air flotation system according to claim 1, wherein the circulating water supply line includes an air flow meter and a valve to control a quantity of the ambient air introduced.

12. The dissolved air flotation system according to claim 1, wherein the circulating water comprises the raw water and the raw water mixed with the coagulant.

\* \* \* \* \*